United States Patent
Zhou et al.

(10) Patent No.: US 10,939,282 B2
(45) Date of Patent: Mar. 2, 2021

(54) DEFAULT VALUE SELECTION FOR MEDIUM ACCESS CONTROL-CONTROL ELEMENT (MAC-CE) BASED PARAMETER VALUE SELECTION

(71) Applicant: QUALCOMM Incorporated, San Diego, CA (US)

(72) Inventors: Yan Zhou, San Diego, CA (US); Makesh Pravin John Wilson, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/281,522

(22) Filed: Feb. 21, 2019

(65) Prior Publication Data

US 2019/0313242 A1 Oct. 10, 2019

Related U.S. Application Data

(60) Provisional application No. 62/653,250, filed on Apr. 5, 2018.

(51) Int. Cl.
*H04W 72/04* (2009.01)
*H04W 8/22* (2009.01)
*H04W 88/02* (2009.01)

(52) U.S. Cl.
CPC ............ *H04W 8/22* (2013.01); *H04W 72/04* (2013.01); *H04W 88/02* (2013.01)

(58) Field of Classification Search
CPC ..... H04L 5/001; H04L 5/0023; H04L 5/0048; H04W 28/18; H04W 72/04; H04W 88/02; H04W 8/22

(Continued)

(56) References Cited

U.S. PATENT DOCUMENTS

2018/0020382 A1* 1/2018 Kim .................. H04W 36/0055
2018/0302889 A1* 10/2018 Guo ...................... H04L 5/0053

(Continued)

OTHER PUBLICATIONS

"3rd Generation Partnership Project; Technical Specification Group Radio Access Network; NR; Physical Layer Procedures for Control (Release 15)", 3GPP Draft, R1-1801293 TS 38213 V1500 CR, 3rd Generation Partnership Project (3GPP), Mobile Competence Centre , 650, Route Des Lucioles , F-06921 Sophia-Antipolis Cedex, France, Feb. 12, 2018 (Feb. 12, 2018), XP051398859, 68 Pages, Retrieved from the Internet:URL:http://www.3gpp.org/ftp/tsg%5Fran/WG1%5FRL1/TSGR1%5FAH/NR%5FAH%5F1801/Docs/ [retrieved on Feb. 12, 2018], Paragraph [10 .1].

(Continued)

*Primary Examiner* — Robert J Lopata
(74) *Attorney, Agent, or Firm* — Patterson + Sheridan, L.L.P.

(57) ABSTRACT

Certain aspects of the present disclosure provide techniques for selecting a default value for one or more User Equipment (UE) parameters when a UE is configured for Medium Access Control-Control Element (MAC-CE) based UE parameter value selection. The UE detects at least one condition relating to a candidate list of values associated with a set of UE parameters, wherein a value of each UE parameter in the set is selected from the candidate list and received by the UE via a MAC-CE. In response to the detection, the UE determines a default value for at least one UE parameter from the set and performs at least one operation corresponding to the at least one UE parameter after setting the default value.

25 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0052377 A1* | 2/2019 | Hwang | .............. | H04W 56/0015 |
| 2019/0215823 A1* | 7/2019 | Kim | ....................... | H04L 1/1664 |
| 2019/0297547 A1* | 9/2019 | Tsai | ....................... | H04W 24/10 |
| 2019/0349867 A1* | 11/2019 | MolavianJazi | ..... | H04W 52/242 |
| 2020/0029262 A1* | 1/2020 | Kim | ................... | H04W 36/0061 |
| 2020/0037350 A1* | 1/2020 | Park | ....................... | H04W 72/12 |
| 2020/0037396 A1* | 1/2020 | Islam | ................ | H04W 52/0229 |

OTHER PUBLICATIONS

Ericsson: "Feature Lead Summary 4 on Beam Measurement and Reporting", 3GPP Draft, R1-1803481 Feature Lead Summary 4 on Beam Management, 3rd Generation Partnership Project (3GPP), V0I. RAN WG1, No. Athens, Greece, Feb. 26, 2018-Mar. 2, 2018, Mar. 5, 2018 (Mar. 5, 2018), XP051398779, 25 Pages, Retrieved from the Internet: URL:http://www.3gpp.org/ftp/tsg%5Fran/WG1%5FRL1/TSGR1%5F92/Docs/ [retrieved on Mar. 5, 2018], Paragraphs [ 4.2.1]. [4.3.2].

Fujitsu: "Ambiguities About Beam Indication and Aperiodic CSI-RS Triggering Offset Configuration in Some Cases", 3GPP Draft, R1-1801892 Ambiguities About Beam Indication and Aperiodic CSI-RS Triggering Offset Final, 3rd Generation Partnership Project (3GPP), vol. RAN WG1, No. Athens, Greece, Feb. 26, 2018-Mar. 2, 2018, Feb. 16, 2018 (Feb. 16, 2018), XP051397050, 9 Pages, Retrieved from the Internet: URL:http://www.3gpp.org/ftp/tsg%5Fran/WG1%5FRL1/TSGR1%5F92/Docs/ [retrieved on Feb. 16, 2018], Paragraph [0003], Figure 3.

International Search Report and Written Opinion—PCT/US2019/019114—ISA/EPO—dated Apr. 23, 2019.

Vivo: "MAC CEs for Beam Management", 3GPP Draft, R2-1801994 MAC CEs for Beam Management, 3rd Generation Partnership Project (3GPP), Mobile Competence Centre , 650, Route Des Lucioles , F-06921 Sophia-Cedex , France, vol. RAN WG2, No. Athens, Greece, Feb. 26, 2018-Mar. 2, 2018, Feb. 14, 2018 (Feb. 14, 2018), XP051399069, 10 Pages, Retrieved from the Internet: URL:http://www.3gpp.org/ftp/tsg%5Fran/WG2%5FRL2/TSGR2%5F101/Docs/ [retrieved on Feb. 14, 2018], Paragraph [2.1.4].

* cited by examiner

DEFAULT VALUE SELECTION FOR MEDIUM ACCESS CONTROL-CONTROL ELEMENT (MAC-CE) BASED PARAMETER VALUE SELECTION

This application claims priority to U.S. Provisional Application No. 62/653,250, entitled "DEFAULT VALUE SELECTION FOR MEDIUM ACCESS CONTROL-CONTROL ELEMENT (MAC-CE) BASED PARAMETER VALUE SELECTION", filed on Apr. 5, 2018, which is expressly incorporated by reference in its entirety

INTRODUCTION

Field

Aspects of the present disclosure relate to wireless communications, and more particularly, to techniques for selecting a default value for one or more User Equipment (UE) parameters when the UE is configured for Medium Access Control-Control Element (MAC-CE) based UE parameter value selection.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a User Equipment (UE). The method generally includes detecting at least one condition relating to a candidate list of values associated with a set of UE parameters, wherein a value of each UE parameter in the set is selected from the candidate list and received by the UE via a Medium Access Control-Control Element (MAC-CE); determining, in response to the detection a default value for at least one UE parameter from the set; and performing at least one operation corresponding to the at least one UE parameter after setting the default value.

Certain aspects provide an apparatus for wireless communication by a UE. The apparatus generally includes means for detecting at least one condition relating to a candidate list of values associated with a set of UE parameters, wherein a value of each UE parameter in the set is selected from the candidate list and received by the UE via a Medium Access Control-Control Element (MAC-CE); means for determining, in response to the detection, a default value for at least one UE parameter from the set; and means for performing at least one operation corresponding to the at least one UE parameter after setting the default value.

Certain aspects of the present disclosure provide an apparatus for wireless communication by a UE. The apparatus generally includes at least one processor and a memory coupled to the at least one processor. The at least one processor is generally configured to detect at least one condition relating to a candidate list of values associated with a set of UE parameters, wherein a value of each UE parameter in the set is selected from the candidate list and received by the UE via a Medium Access Control-Control Element (MAC-CE); in response to the detection, determine a default value for at least one UE parameter from the set; and perform at least one operation corresponding to the at least one UE parameter after setting the default value.

Certain aspects of the present disclosure provide a computer-readable medium for wireless communication by a UE. The computer-readable medium generally stores instructions executable by at least one processor for performing a method generally including detecting at least one condition relating to a candidate list of values associated with a set of UE parameters, wherein a value of each UE parameter in the set is selected from the candidate list and received by the UE via a Medium Access Control-Control Element (MAC-CE); determining, in response to the detection a default value for at least one UE parameter from the set; and performing at least one operation corresponding to the at least one UE parameter after setting the default value.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
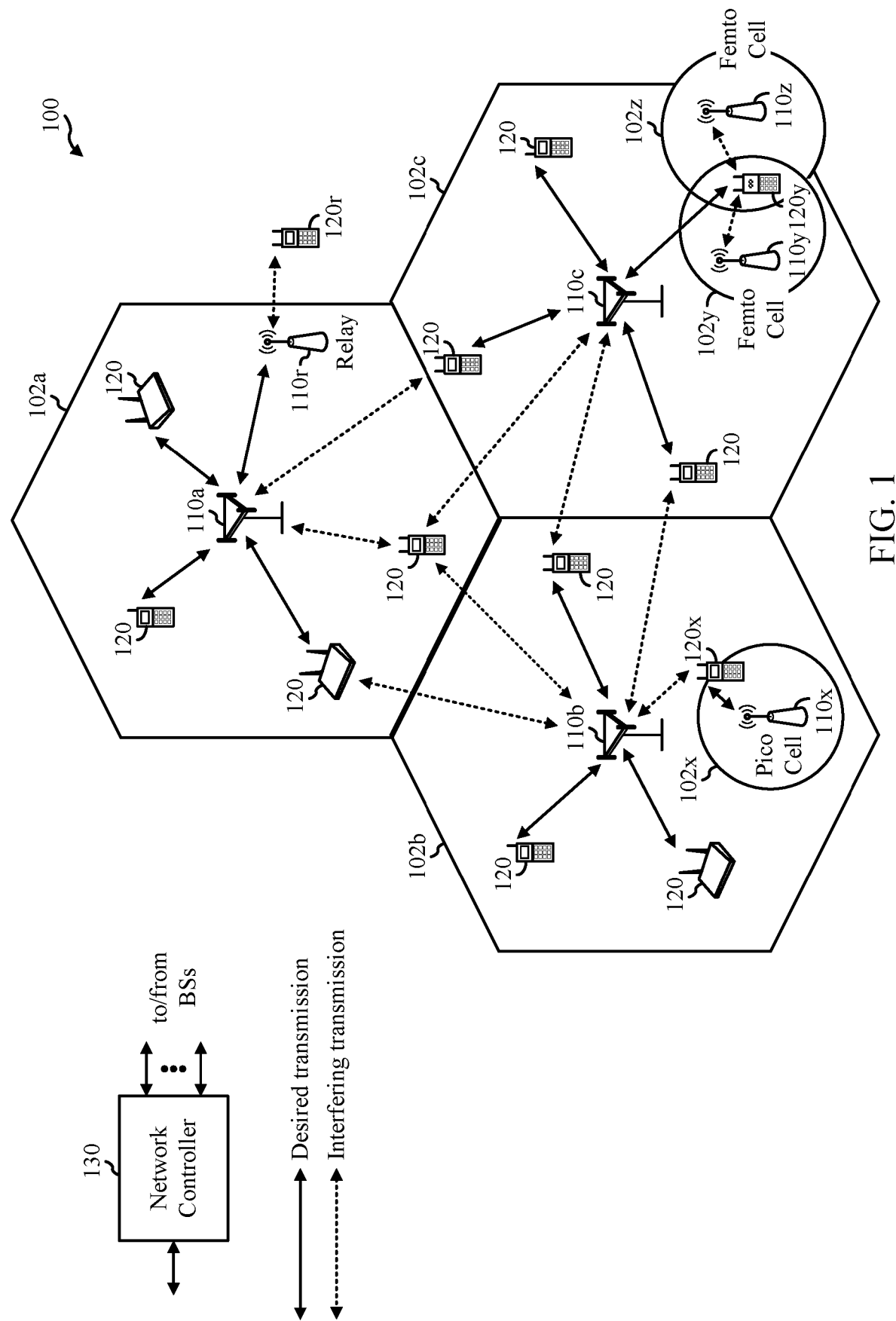
FIG. 1 is a block diagram conceptually illustrating an example telecommunications system, in accordance with certain aspects of the present disclosure.

5G NR provides a configuration mode including Medium Access Control-Control Element (MAC-CE) based UE parameter value selection. In this configuration mode, a UE is generally configured with a set of UE parameters sharing a common candidate value list. The candidate value list includes a list of values and each UE parameter may be assigned one or more values from the list. For each UE parameter in the set, a gNB selects one value from the common candidate value list and communicates the selected value to the UE via MAC-CE.

In certain aspects, at certain times during the MAC-CE based UE parameter value selection process, a UE may not have or be certain of a value to be applied to a particular UE parameter. For example, in a first scenario after the UE receives a RRC reconfiguration of a currently configured candidate list and before the UE receives and/or applies a MAC-CE selected value for a given UE parameter, the UE may not know what value to apply to the UE parameter. For example, a previous value of the UE parameter selected from the previous (before reconfiguration) candidate list may have changed in the new candidate list and may not be valid anymore. So the UE may not know what value to apply to the UE parameter until the UE receives a MAC-CE indicating a value selection for the UE parameter from the updated candidate list.

In a second scenario, before the UE is initially configured with a candidate list, or after the UE receives the initial candidate list but before receiving a MAC-CE selected value for a given parameter, the UE may not know what value to apply to a UE parameter until it receives a MAC-CE indicating a selected value for the parameter.

Certain aspects of the present disclosure discuss techniques for determining a default value for one or more UE parameters, for example, when there is an ambiguity relating to UE parameter value selection when the UE is configured for MAC-CE based UE parameter value selection process.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
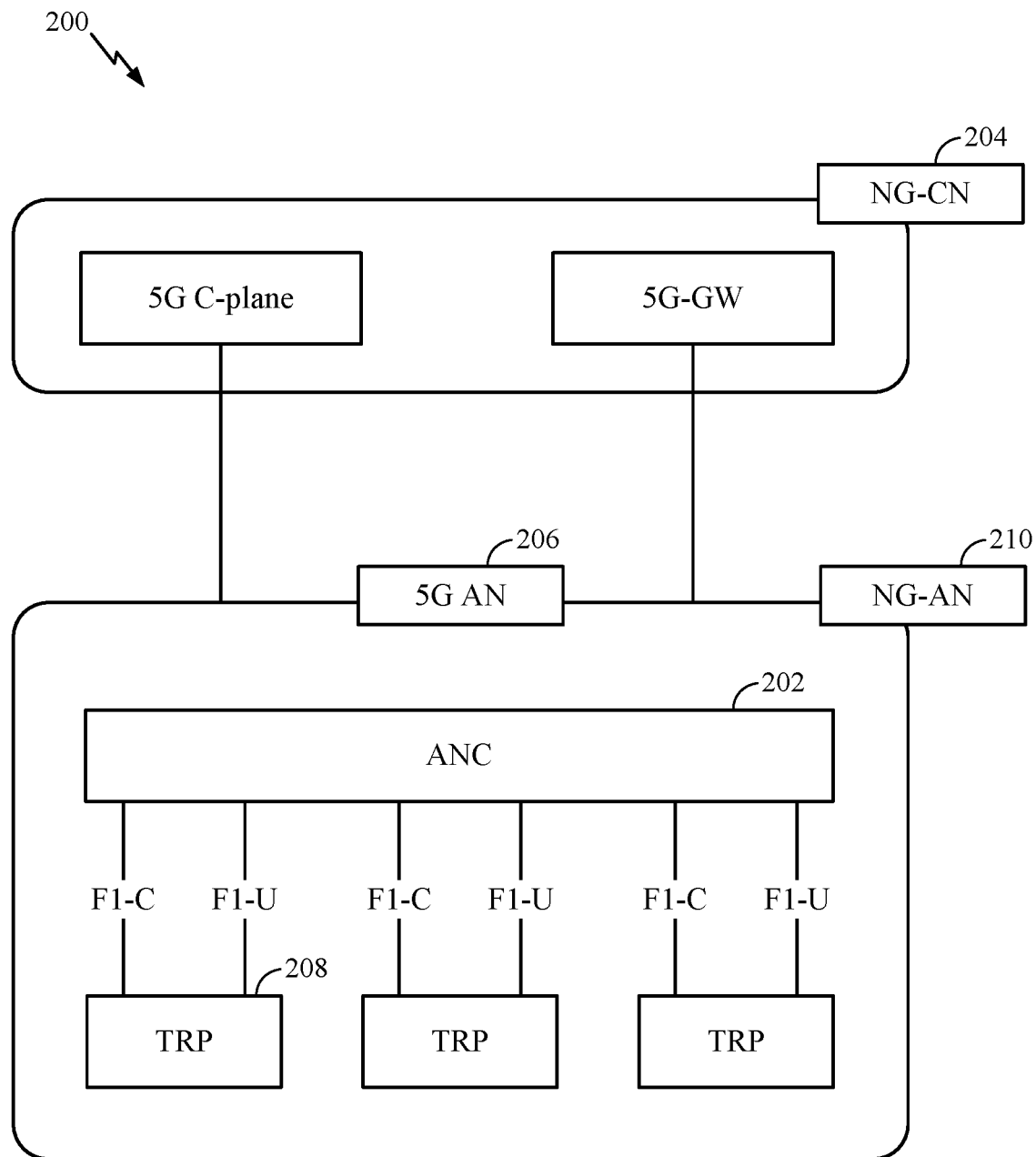
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
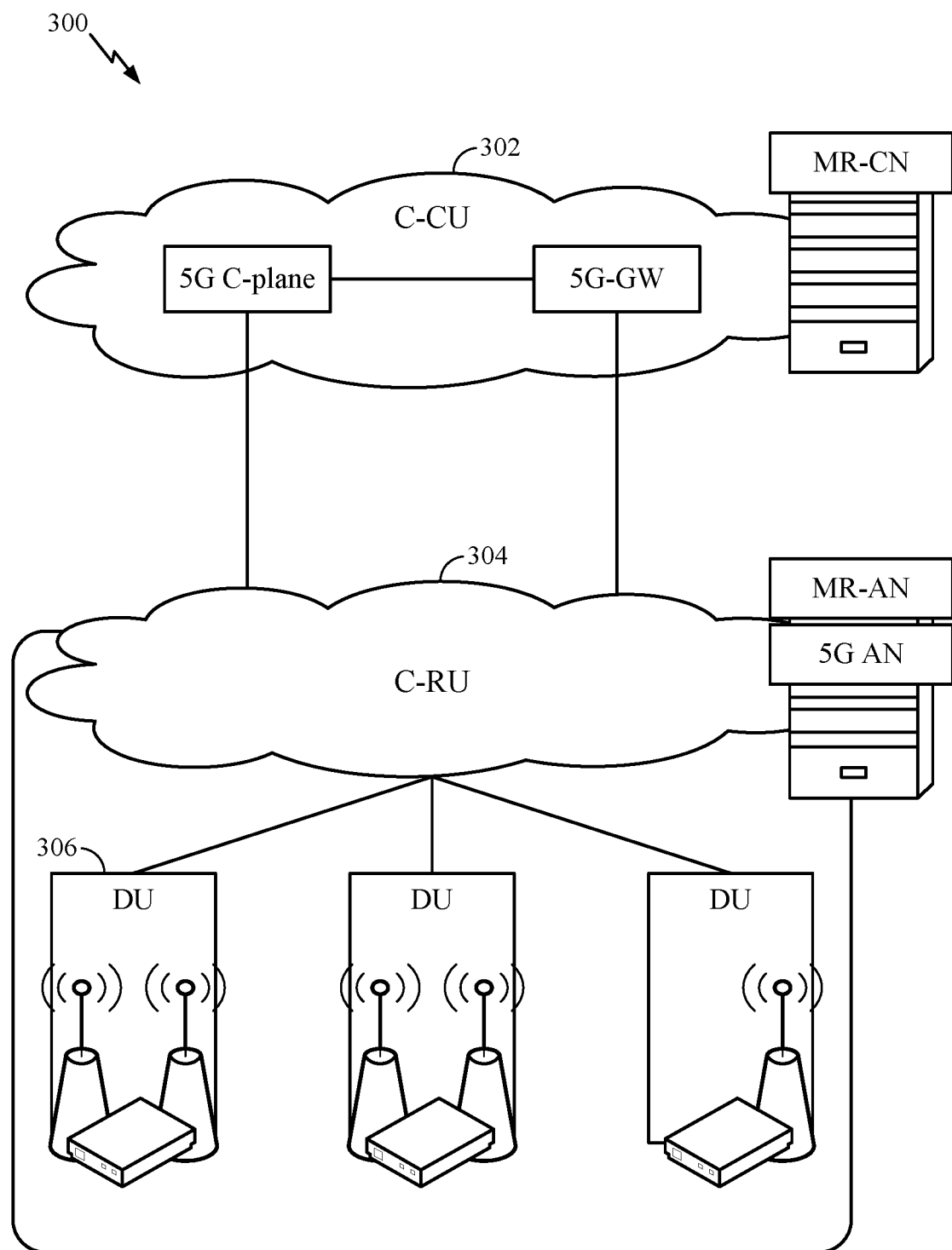
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
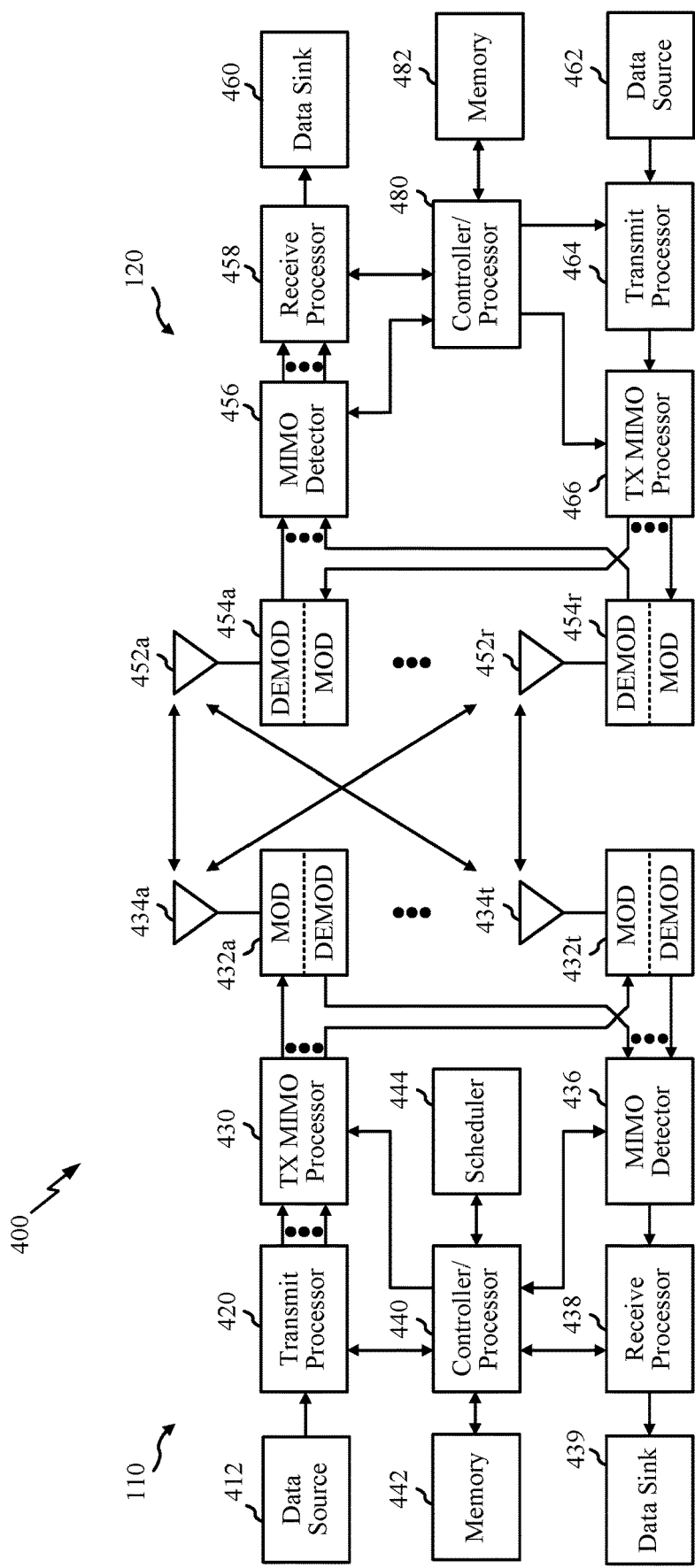
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
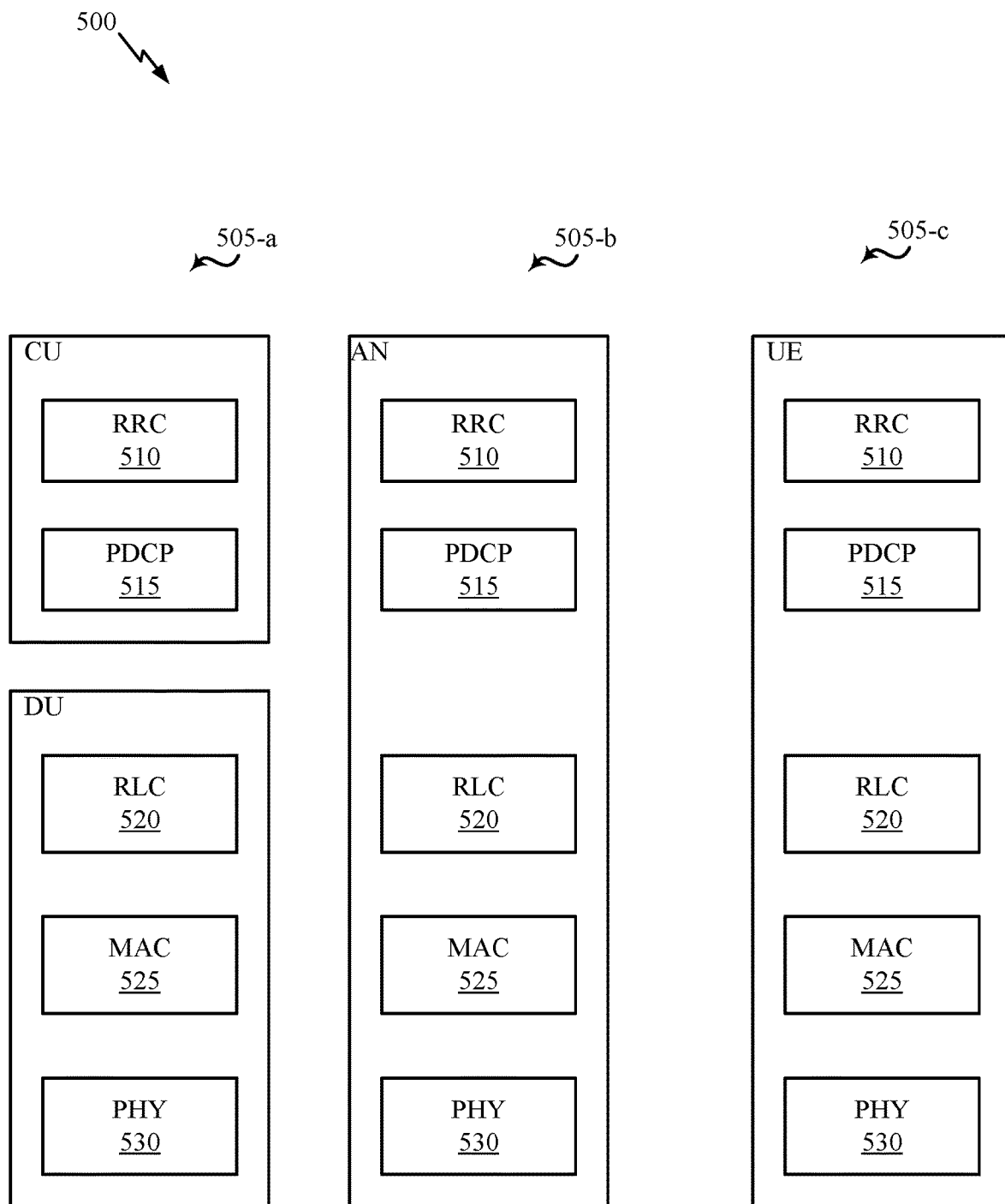
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
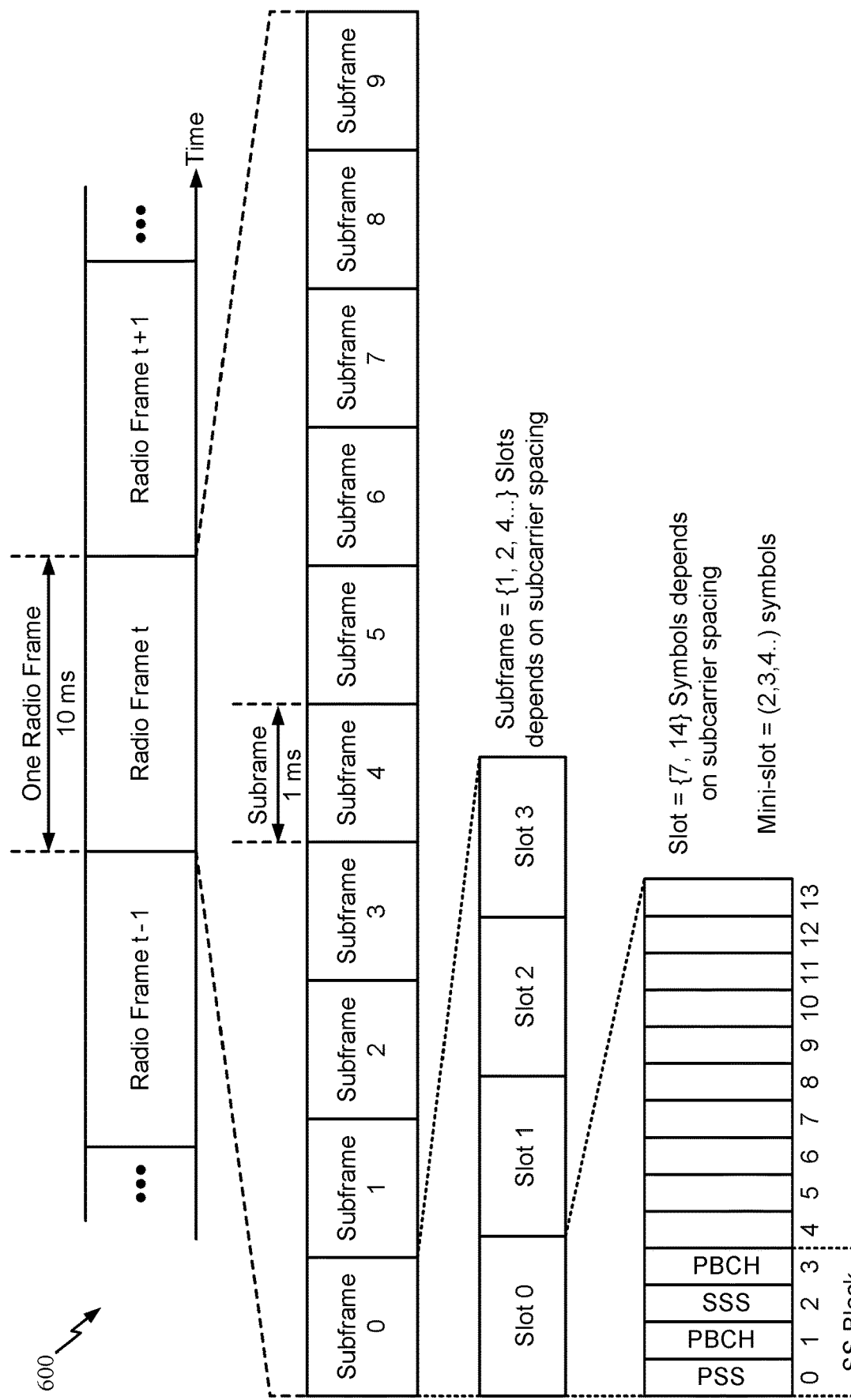
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Default Parameter Value Selection for
MAC-CE Based Parameter Value Selection 5G NR provides a configuration mode including Medium Access Control-Control Element (MAC-CE) based UE parameter value selection. In this configuration mode, a UE is generally configured with a set of UE parameters sharing a common candidate value list. The candidate value list includes a list of values and each UE parameter may be assigned one or more values from the list. Each value from the candidate list is generally identified by a unique Identifier (ID). For each UE parameter in the set, a gNB selects one value from the common candidate value list and communicates the selected value to the UE via MAC-CE. The common candidate value list is initially sent by the gNB to the UE via an RRCReconfig message. This initial configuration of the UE with an initial common candidate value list is termed as RRC configuration of the candidate list. The gNB, at any time, may update the candidate list, in whole or in part, via the RRCReconfig message. This updating of an already configured candidate list is termed as RRC Reconfiguration of the candidate list.

In certain aspects, the MAC-CE based configuration may be applied to various sets of UE parameters for different use cases. For example, in one such use case, the gNB configures a list of DL/UL beam IDs and selects one DL/UL beam ID from a list of beam IDs for each DL/UL resource (e.g., time/frequency resource). The gNB communicates the selected beam IDs to a UE via MAC-CE. In this case, the list of DL/UL beam IDs is the candidate value list and DL/UL beam used on each DL/UL resource is a UE parameter for which values are selected from the candidate value list.

According to another use case, the gNB configures a candidate list of logical channel IDs and selects an ID for each component carrier or serving cell, and communicates the selected ID served by each component carrier or serving cell to a UE via the MAC-CE. In another use case, the gNB configures a candidate list of time alignment timer values and selects a value for each time alignment group, and communicates the selected values to a UE via the MAC-CE. In another use case, the gNB configures a candidate list of time offset values between PDCCH and scheduled PDSCH/PUSCH and selects a value per Control Resource Set (CORESET), and communicates the selected values via the MAC-CE.

In certain aspects, after the RRC configuration or RRC reconfiguration of a candidate list, the gNB sends, for each intended parameter, a MAC-CE command including an indication of a value selected from the candidate list. The UE acknowledges each MAC-CE command and applies the selected value to the intended UE parameter.

In certain aspects, at certain times during the MAC-CE based UE parameter value selection process, a UE may not have or be certain of a value to be applied to a particular UE parameter. For example, in a first scenario after the UE receives a RRC reconfiguration of a currently configured candidate list and before the UE receives and/or applies a MAC-CE selected value for a given UE parameter, the UE may not know what value to apply to the UE parameter. For example, a previous value of the UE parameter selected from the previous (before reconfiguration) candidate list may have changed in the new candidate list and may not be valid anymore. So the UE may not know what value to apply to the UE parameter until the UE receives a MAC-CE indicating a value selection for the UE parameter from the updated candidate list.

In a second scenario, before the UE is initially configured with a candidate list, or after the UE receives the initial candidate list but before receiving a MAC-CE selected value for a given parameter, the UE may not know what value to apply to a UE parameter until it receives a MAC-CE indicating a selected value for the parameter.

Certain aspects of the present disclosure discuss techniques for determining a default value for one or more UE parameters, for example, when there is an ambiguity relating to UE parameter value selection when the UE is configured for MAC-CE based UE parameter value selection process.

Figure 7:
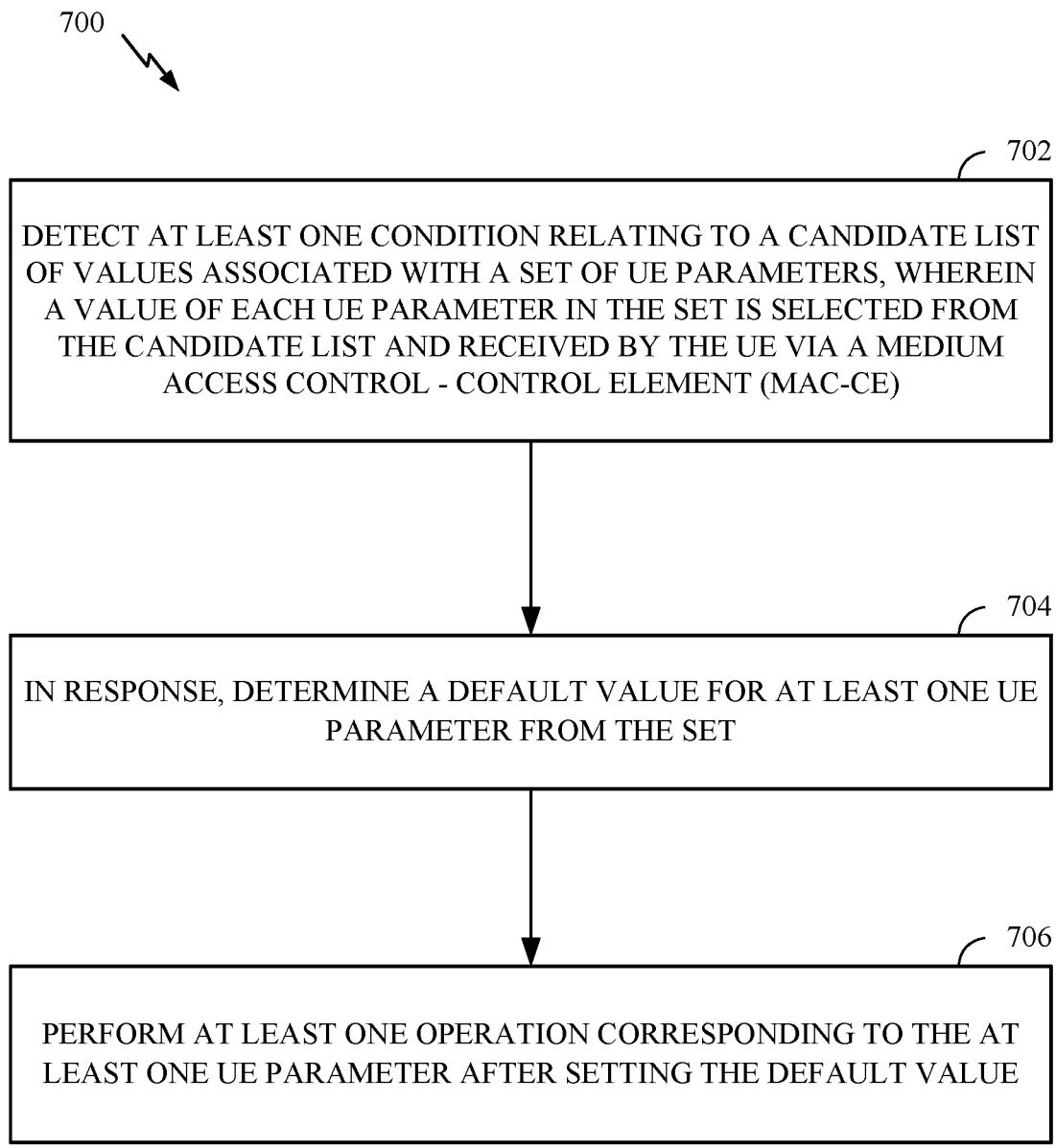
FIG. 7 illustrates example operations 700 performed by a UE for determining a default value for at least one UE parameter during MAC-CE based UE parameter selection, in accordance with certain aspects of the present disclosure.

FIG. 7 illustrates example operations 700 performed by a UE for determining a default value for at least one UE parameter during MAC-CE based UE parameter selection, in accordance with certain aspects of the present disclosure. Operations 700 begin, at 702, by detecting at least one condition relating to a candidate list of values associated with a set of UE parameters, wherein a value of each UE parameter in the set is selected from the candidate list and received by the UE via a MAC-CE. At 704, the UE, in response to the detecting, determines a default value for at least one UE parameter from the set. At 706, the UE performs at least one operation corresponding to the at least one UE parameter after setting the default value.

In an aspect the at least one UE parameter may include one of the UE parameters in use cases discussed above.

In certain aspects, the at least one condition relating to the candidate list may include the first scenario or the second scenario discussed above. For example, in a first scenario the UE may receive an updated candidate list of values and may detect that the updated candidate list updates the entire candidate list or a portion of the candidate list. Additionally or alternatively, the UE may detect that the UE has not received (and/or applied) a value (e.g., a changed value) of the at least one parameter selected from the updated candidate list.

In certain aspects, for the first scenario, one or more rules may be defined for the UE to determine a default value of one or more UE parameters from the set of UE parameters. It may be noted that an individual rule or a combination thereof may be used to determine default values for UE parameters in a parameter set. For example, a same or different rule may be used to determine a default value for each UE parameter in the set.

In certain aspects, according to a first rule, the UE may decide to use a previously selected value of a UE parameter (e.g., selected from a previously configured candidate list) as the default value until the UE receives and applies a value of the UE parameter selected from the updated candidate list via the MAC-CE.

In certain aspects, according to a second rule, the UE may decide to use a value corresponding to a configured ID from the previous candidate list or the updated candidate list as the default value. As noted above, each value in a candidate list is identified by a unique ID. In an aspect, the configured ID may be defined in the specification (e.g., 5G NR specification). For example, the configured ID may be configured to a lowest or highest ID in the list, and the value corresponding to the configured ID may be used as the default value for a given UE parameter. In certain aspects the configured ID may be communicated to the UE by the gNB and may be dynamically updated.

In certain aspects, according to a third rule, the UE may decide to use as a default value for a given UE parameter, a most recently used value or a most recently selected value assigned to any of the UE parameters in the set (e.g., considering a value recently used or selected for the given UE parameter) or other UE parameters from the set (e.g., not considering a value used or selected for the given UE parameter). In an aspect, the parameter values qualifying as most recently used may be defined in the specification (e.g., 5G specification or communicated by the gNB) and may include values used or selected, for example, in the last few symbols. In an aspect, the other UE parameters of the set considered for determination of the default value include one or more parameter values not affected by the updated candidate list. For example, a parameter value unaffected by the candidate list update means that the value ID as well as the value itself assigned to the parameter did not change in the updated candidate list. In an aspect, the parameter values considered for the default value selection is restricted to values of those parameters from the set associated with periodic or semi-persistent UE operation. For example, values corresponding to UE parameters associated with aperiodic UE operation are not considered to avoid ambiguity due to potential missing of the trigger for the aperiodic UE operation. In an aspect, if the UE detects that multiple parameter values (e.g., used or selected for multiple UE parameters) qualify as most recently used in a given time period, the UE selects a most recently used parameter value from the multiple parameter values in accordance to a defined rule. For example, the UE may select a value with a lowest or highest parameter ID. In an aspect, the rule may be defined in the specification (e.g., 5G NR specification) or set and communicated by the gNB.

In certain aspects, the above rules for determining a default value for a UE parameter may be used for determining default values only for the UE parameters whose previously selected value is affected by the candidate list update. For example, a previously selected value of a UE parameter may be determined as affected by the updated candidate list if the parameter value has changed or been removed in the updated list (e.g., whole list is updated, value ID is changed or removed, or value ID remains the same in the updated list but value is replaced with a changed value).

Figure 8:
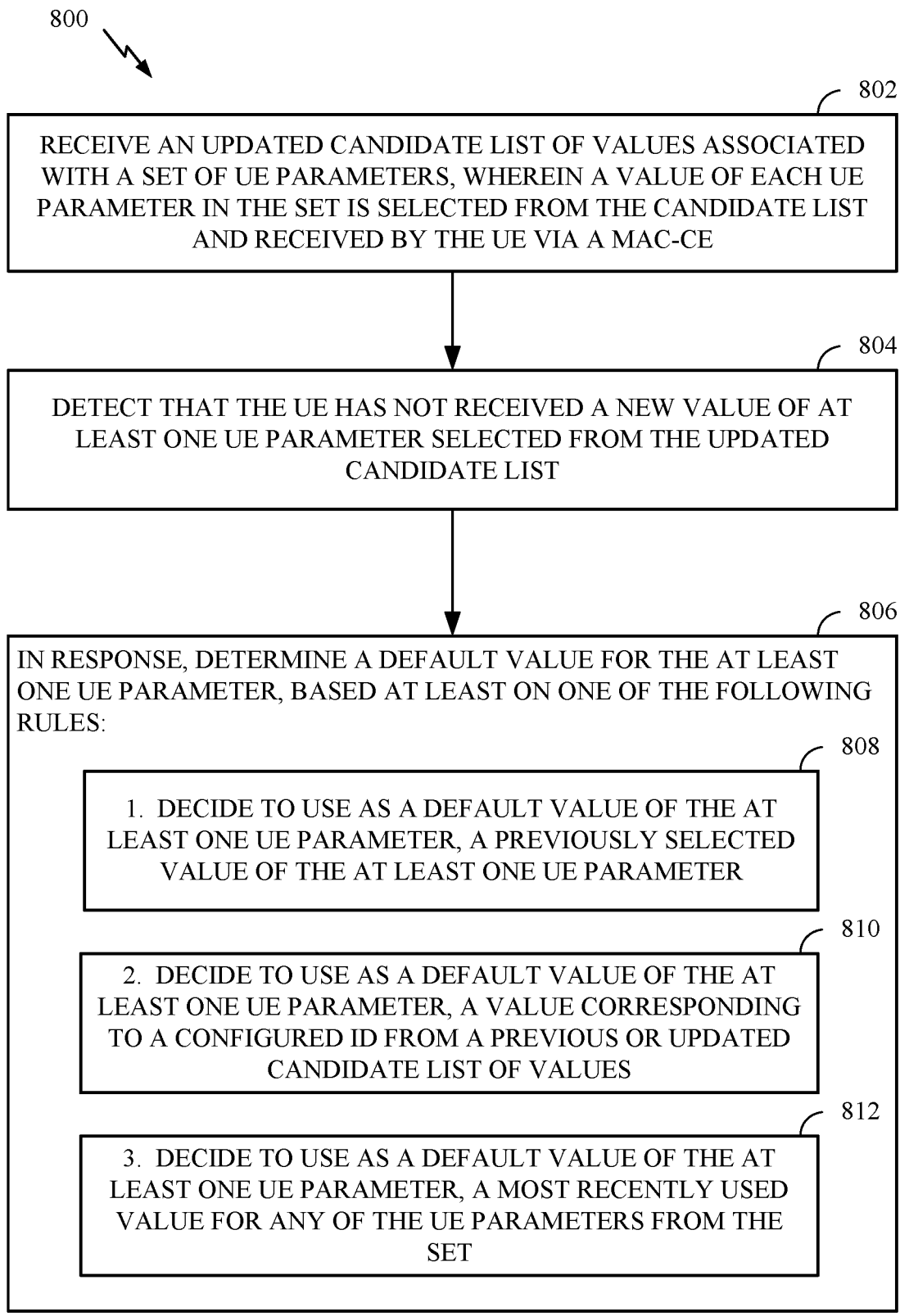
FIG. 8 illustrates example operations 800 performed by a UE in a first scenario for determining a default value for at least one UE parameter during MAC-CE based UE parameter selection, in accordance with certain aspects of the present disclosure.

FIG. 8 illustrates example operations 800 performed by a UE in the first scenario discussed above for determining a default value for at least one UE parameter during MAC-CE based UE parameter selection, in accordance with certain aspects of the present disclosure.

Operations 800 begin, at 802, by the UE receiving an updated candidate list of values associated with a set of UE parameters, wherein a value of each UE parameter in the set is selected from the candidate list and received by the UE via a MAC-CE.

At 804, the UE detects that the UE has not received a new value of the at least one UE parameter selected from the updated candidate list.

At 806, the UE, in response to detecting that the candidate list has been updated and that the UE has not received a newly selected value for the at least one parameter from the updated candidate list, determines a default value for the at least one UE parameter based at least on one of three rules.

At 808, based on a first rule, the UE decides to use as default value of the at least one UE parameter, a previously selected value of the at least one UE parameter, for example from a previous candidate value list.

At 810, based on a second rule, the UE decides to use as a default value of the at least one UE parameter, a value corresponding to a configured ID from a previous or the update candidate value list.

At 812, based on a third rule, the UE decides to use as a default value of the at least one parameter, a most recently used value for any of the UE parameters from the set.

In certain aspects, another condition relating to the candidate list in response to which a UE may determine a default value for a UE parameter may include the second scenario discussed above. For example, in a second scenario the UE may detect that the UE has not received an initial candidate list (e.g., no initial candidate list configuration), or that the UE has received the initial candidate list but has not received and/or applied a MAC-CE selected value for a given parameter.

In certain aspects, for the second scenario, one or more rules may be defined for the UE to determine a default value of one or more UE parameters from the set of UE parameters. Similar to the rules defined for the first scenario, it may be noted that an individual rule or a combination thereof may be used to determine default values for UE parameters in a parameter set. For example, a same or different rule may be used to determine a default value for each UE parameter in the set.

In certain aspects, according to a first rule, for each UE parameter the UE may use a default value as defined by the specification (e.g., 5G NR specification) or as dynamically signaled by the gNB. For example, the UE may decide to use a candidate value corresponding to a configured ID in the list. In an aspect, the configured ID may be defined by the specification and/or signaled by the gNB. For example, the configured ID may include a lowest or highest ID in the list.

In certain aspects, according to a second rule, for each UE parameter, UE may not perform one or more operations corresponding to the UE parameter until the UE receives a MAC-CE selected value for the UE parameter.

Figure 9:
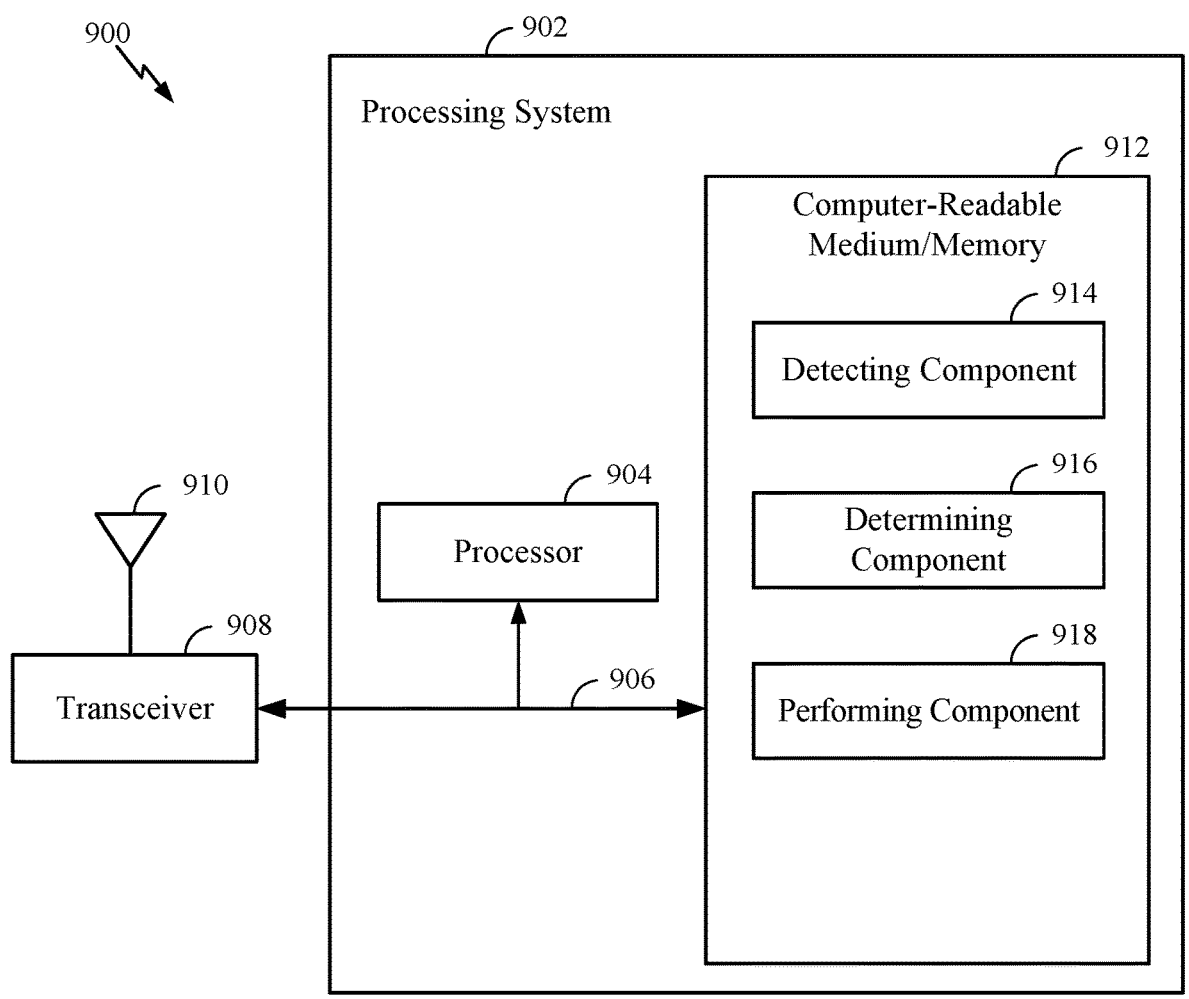
FIG. 9 illustrates a communications device 900 that may include various components (e.g., corresponding to means-plus-function components) configured to perform operations for the techniques disclosed herein, such as the operations illustrated in FIG. 7.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signal described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions that when executed by processor 904, cause the processor 904 to perform the operations illustrated in FIG. 7, or other operations for performing the various techniques discussed herein.

In certain aspects, the processing system 902 further includes a detecting component 914 for performing the detecting operation illustrated in FIG. 7. Additionally, the processing system 902 includes a determining component 916 for performing the determining operation illustrated in FIG. 7. Additionally, the processing system 902 includes a performing component 918 for performing the performing operation illustrated in FIG. 7. The detecting component 914, determining component 916, and performing component 918 may be coupled to the processor 904 via bus 906. In certain aspects, the detecting component 914, determining component 916, and performing component 918 may be hardware circuits. In certain aspects, the detecting component 914, determining component 916, and performing component 918 may be software components that are executed and run on processor 904.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    detecting at least one condition relating to a candidate list of values associated with a set of UE parameters, wherein a value of each UE parameter in the set is selected from the candidate list and received by the UE via a Medium Access Control-Control Element (MAC-CE);
    receiving an updated candidate list of values, wherein detecting the at least one condition includes:
        detecting that the updated candidate list updates the entire candidate list or a portion of the candidate list; and
        detecting that the UE has not received a value or received a changed value of the at least one UE parameter selected from the updated candidate list;
    in response to detecting the at least one condition, determining a default value for at least one UE parameter from the set; and
    performing at least one operation corresponding to the at least one UE parameter after setting the default value.

2. The method of claim 1, further comprising:
    deciding to use a previously selected value of the at least one UE parameter as the default value until receiving the value of the at least one UE parameter selected from the updated candidate list.

3. The method of claim 1, further comprising:
    detecting that an identifier (ID) of a value or the value itself of the at least one UE parameter previously selected from the candidate list of values has changed or removed in the updated candidate list.

4. The method of claim 3, further comprising:
    deciding to use a value corresponding to a configured ID from the candidate list or the updated candidate list as the default value.

5. The method of claim 4, further comprising receiving the configured ID from a serving base station.

6. The method of claim 1, further comprising:
    deciding to use at least one of a most recently used value or a most recently selected value for at least one of:
        any of the UE parameters from the set including the at least one UE parameter, or
        other UE parameters from the set not including the at least one UE parameter.

7. The method of claim 6, wherein the other UE parameters include parameters from the set whose corresponding values are not changed in the updated candidate list.

8. The method of claim 6, further comprising:
    restricting the any of the UE parameters and the other UE parameters to parameters from the set associated with periodic or semi-persistent UE operation.

9. The method of claim 6, further comprising:
    selecting a value from multiple most recently used values within a given time period, based on a configured rule.

10. A method for wireless communication by a user equipment (UE), comprising:
    detecting at least one condition relating to a candidate list of values associated with a set of UE parameters, wherein a value of each UE parameter in the set is selected from the candidate list and received by the UE via a Medium Access Control-Control Element (MAC-CE), and wherein detecting the at least one condition includes detecting at least one of the UE has not received the candidate list or that the UE has not received a value of the at least one UE parameter selected from the candidate list;
    in response to detecting the at least one condition, determining a default value for the at least one UE parameter from the set; and
    performing at least one operation corresponding to the at least one UE parameter after setting the default value, wherein performing the at least one operation corresponding to the at least one UE parameter comprises deciding not to perform the at least one operation corresponding to the at least one UE parameter until receiving a value of the at least one UE parameter selected from the candidate list.

11. The method of claim 10, further comprising:
    deciding to use a value corresponding to a configured ID from the candidate list as the default value.

12. The method of claim 11, further comprising:
    receiving the configured ID from a serving base station.

13. An apparatus for wireless communication by a user equipment (UE), comprising:
    means for detecting at least one condition relating to a candidate list of values associated with a set of UE parameters, wherein a value of each UE parameter in the set is selected from the candidate list and received by the UE via a Medium Access Control-Control Element (MAC-CE);
    means for receiving an updated candidate list of values, wherein the means for detecting the at least one condition include:
        means for detecting that the updated candidate list updates the entire candidate list or a portion of the candidate list; and means for detecting that the UE has not received a value or received a changed value of the at least one UE parameter selected from the updated candidate list;

means for determining, in response to detecting the at least one condition, a default value for at least one UE parameter from the set; and means for performing at least one operation corresponding to the at least one UE parameter after setting the default value.

14. The apparatus of claim 13, further comprising:

means for deciding to use a previously selected value of the at least one UE parameter as the default value until receiving the value of the at least one UE parameter selected from the updated candidate list.

15. The apparatus of claim 13, further comprising:

means for detecting that an identifier (ID) of a value or the value itself of the at least one UE parameter previously selected from the candidate list of values has changed or removed in the updated candidate list.

16. The apparatus of claim 15, further comprising:

means for deciding to use a value corresponding to a configured ID from the candidate list or the updated candidate list as the default value.

17. The apparatus of claim 16, further comprising:

means for receiving the configured ID from a serving base station.

18. An apparatus for wireless communication by a user equipment (UE), comprising:

at least one processor configured to:
 detect at least one condition relating to a candidate list of values associated with a set of UE parameters, wherein a value of each UE parameter in the set is selected from the candidate list and received by the UE via a Medium Access Control-Control Element (MAC-CE);
 receive an updated candidate list of values, wherein detecting the at least one condition includes:
  detecting that the updated candidate list updates the entire candidate list or a portion of the candidate list; and
  detecting that the UE has not received a value or received a changed value of the at least one UE parameter selected from the updated candidate list;
 in response to detecting the at least one condition, determine a default value for at least one UE parameter from the set; and
 perform at least one operation corresponding to the at least one UE parameter after setting the default value.

19. The apparatus of claim 18, wherein the at least one processor is further configured to:

decide to use a previously selected value of the at least one UE parameter as the default value until receiving the value of the at least one UE parameter selected from the updated candidate list.

20. The apparatus of claim 18, wherein the at least one processor is further configured to:

detect that an identifier (ID) of a value or the value itself of the at least one UE parameter previously selected from the candidate list of values has changed or removed in the updated candidate list.

21. The apparatus of claim 18, wherein the at least one processor is further configured to:

decide to use a value corresponding to a configured ID from the candidate list or the updated candidate list as the default value.

22. A non-transitory computer-readable medium for wireless communication by a user equipment (UE), comprising instructions that, when executed by at least one processor, cause the at least one processor to:

detect at least one condition relating to a candidate list of values associated with a set of UE parameters, wherein a value of each UE parameter in the set is selected from the candidate list and received by the UE via a Medium Access Control-Control Element (MAC-CE);

receive an updated candidate list of values, wherein detecting the at least one condition includes:
 detecting that the updated candidate list updates the entire candidate list or a portion of the candidate list; and
 detecting that the UE has not received a value or received a changed value of the at least one UE parameter selected from the updated candidate list;

in response to detecting the at least one condition, determine a default value for at least one UE parameter from the set; and perform at least one operation corresponding to the at least one UE parameter after setting the default value.

23. The non-transitory computer-readable medium of claim 22, further comprising instructions that cause the at least one processor to:

decide to use a previously selected value of the at least one UE parameter as the default value until receiving the value of the at least one UE parameter selected from the updated candidate list.

24. The non-transitory computer-readable medium of claim 22, further comprising instructions that cause the at least one processor to:

detect that an identifier (ID) of a value or the value itself of the at least one UE parameter previously selected from the candidate list of values has changed or removed in the updated candidate list.

25. The non-transitory computer-readable medium of claim 24, further comprising:

decide to use a value corresponding to a configured ID from the candidate list or the updated candidate list as the default value.

* * * * *